US008219532B2

(12) United States Patent
Arunachalam

(10) Patent No.: US 8,219,532 B2
(45) Date of Patent: Jul. 10, 2012

(54) SMART MEDIATION SYSTEM IN A SERVICE ORIENTED ARCHITECTURE

(75) Inventor: Ravi Shankar Arunachalam, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 779 days.

(21) Appl. No.: 12/340,987

(22) Filed: Dec. 22, 2008

(65) Prior Publication Data

US 2010/0161563 A1    Jun. 24, 2010

(51) Int. Cl.
    *G06F 17/30* (2006.01)
(52) U.S. Cl. .......................... 707/674; 707/675
(58) Field of Classification Search .................. 707/769, 707/705, 688, 674, 622, 754, 740, 675
    See application file for complete search history.

(56) References Cited

U.S. PATENT DOCUMENTS

| 2003/0101146 | A1* | 5/2003 | Yeo et al. ....................... 705/400 |
| 2003/0105763 | A1* | 6/2003 | Chatfield et al. ................. 707/10 |
| 2004/0230636 | A1* | 11/2004 | Masuoka et al. ............... 708/800 |
| 2007/0300240 | A1 | 12/2007 | Viegener et al. |

OTHER PUBLICATIONS

Dyachuk, Dmytro, "Dependability and Performance gains in using Proxies for Web Services," University of Saskatchewan, Saskatoon, 2005 Graduate Student Symposium, Sep. 8, 2005, pp. 1-8.
Funk, Caroline, et al., "Adaption of Composite Services in Pervasive Computing Environments," Proceedings of IEEE International Conference on Pervasive Services, Istanbul, Turkey, Jul. 13, 2007.
"Monitoring the Availability of Web Services at Seekda.com" blog, http://seekda.com/blog/monitoring-the-availability-of-web-services, Jan. 6, 2008 at 16:12.
"Web Service Monitor," SiteScope User's Guide, http://schist.und.nodak.edu:8899/SiteScope/docs/WebServiceMonitor.htm, Sep. 17, 2008.

* cited by examiner

*Primary Examiner* — Charles Rones
*Assistant Examiner* — Fariborz Khoshnoodi
(74) *Attorney, Agent, or Firm* — Anthony V. S. England; William Steinberg

(57) ABSTRACT

In one embodiment, a service mediator provides a service that is a composite of atomic services and executes a recovery pattern in the event that a service is not available. More particularly, in an initial phase of operation, the service mediator determines one or more recovery patterns for each atomic service offered in the composite service and stores in a database an identity of each such recovery pattern for each atomic service. In subsequent operation, the service mediator monitors the availability of each atomic service. When a user inquires of a composite service, the service mediator determines if any of its atomic services is unavailable. If an atomic service is unavailable, the service mediator selects a recovery pattern and executes it.

16 Claims, 3 Drawing Sheets

SMART MEDIATION SYSTEM IN A SERVICE ORIENTED ARCHITECTURE

BACKGROUND

This written description is in the field of providing services in a Service Oriented Architecture (SOA). More particularly, the description relates to monitoring and recovering from an unavailability of an atomic service.

Many different types of computing systems have attained widespread use around the world. These computing systems include personal computers, servers, mainframes and a wide variety of stand-alone and embedded computing devices. In general, all of these systems have a processor and an operating system that controls operation of the processor and components peripheral to the processor. Executable application programs are stored in a computer's hard drive. The computer's processor causes application programs to run in response to user inputs.

Sprawling client-server systems exist, with applications and information spread across many PC networks, mainframes and minicomputers. In a distributed system connected by networks, a user may access many application programs, databases, network systems, operating systems and mainframe applications. Computers provide individuals and businesses with a host of software applications including word processing, spreadsheet, and accounting. Further, networks enable high speed communication between people in diverse locations by way of e-mail, websites, instant messaging, and web-conferencing.

Thus, in a modern system, a plurality of computers—including servers—are connected together through a network. Each computer may run application programs for performing certain functions. These application programs may include word-processing, e-mail, graphics, document viewing and mark-up, spreadsheet, database, music player, internet browser, photo-shop, games, anti-virus, as well as a host of other application programs too numerous to mention.

Further, websites at a server may provide services to a user of a computer connected to the network. For example, a travel company may provide a website at a server that enables a user to schedule and purchase airline flights, hotel reservations, and a rental car. These atomic services, although presented to the user at a single website as a single composite service, may actually be located on servers in different locations. Thus, on a server at one location will be a database of flight times for flights from a first airline company. On another server will be a database of flight times for a second airline company. Another server at yet another location will provide a database for car rentals, etc. But, from the user's perspective, the atomic services appear to be presented from a single source.

Thus, a composite service is a service whose implementation calls other services. In contrast, an atomic service is one that is self-contained and does not invoke another service from a different source. Thus, for example, a travel company website may be a composite service that presents information and enables a user to schedule and purchase one, some, or all of the atomic services offered; namely, an airline flight, a hotel room, and a rental car. More particularly, one atomic service may be provided by one airline company and another atomic service may be provided by another airline company. The composite service presents data from each airline company so that a user can choose between the services.

Sometimes, an atomic service which is one of a composite of atomic services will be unavailable for some reason. When a user accesses the composite service cite he or she does not know that one of the services is unavailable. The user may go through a considerable process of making selections and entering data only to find out that she can't make the reservation she was applying for because that service is unavailable, leading to considerable dissatisfaction.

BRIEF SUMMARY

One embodiment is a system for providing a composite service comprising a plurality of atomic services. The system comprises a memory to store a database of data identifying recovery patterns associated with each one of the plurality of atomic services and to store in the database an updated availability status of each of the plurality of atomic services. The system further comprises a processor to determine from the database if an atomic service is unavailable and to determine from the database one or more recovery patterns associated with an unavailable service. The processor further selects one of the one or more determined recovery patterns, and executes the selected recovery pattern.

Another embodiment is a computer-implemented method for providing atomic services through a composite service offering each atomic service. The method comprises determining by a server connected to a network, a recovery pattern for each atomic service and storing data identifying the recovery pattern in a database. The method further comprises periodically determining by the server, an availability of each atomic service and storing updated availability information for each atomic service in the database. The method comprises receiving from a user computer connected to the network, a request to use the composite service. The method also comprises determining from the database if an atomic service is currently unavailable, selecting a recovery pattern from among one or more recovery patterns stored in the database for the unavailable atomic service, and executing the identified recovery pattern for the unavailable service.

Another embodiment provides a computer program product containing instructions effective, when executing in a data processing system, to cause the system to perform a series of operations for providing recovery from an unavailable service condition. The operations comprise storing a database of data identifying recovery patterns associated with each one of the plurality of atomic services, a recovery pattern comprising a procedure to follow when a service is unavailable. The operations comprise storing in the database an availability status of each of the plurality of atomic services. The operations additionally comprise determining from the database if an atomic service is unavailable. The operations further comprise determining from the database one or more recovery patterns associated with an unavailable service. The operations also comprise selecting one of the one or more determined recovery patterns, and executing the selected recovery pattern.

Another embodiment is service mediator for selecting and executing a recovery pattern when an atomic service is unavailable. An embodiment comprises a service interface module to determine for each of a plurality of atomic services at least one recovery pattern. A service availability monitor monitors the availability of each of a plurality of atomic services. A database stores information about recovery patterns available for each atomic service and stores updated availability information of each atomic service. A recovery plan selector selects and executes a recovery pattern for an unavailable service.

BRIEF DESCRIPTION OF THE SEVERAL VIEWS OF THE DRAWINGS

Advantages will become apparent upon reading the following detailed description and upon reference to the accompanying drawings in which, like references may indicate similar elements.

DETAILED DESCRIPTION OF EMBODIMENTS

Figure 1:
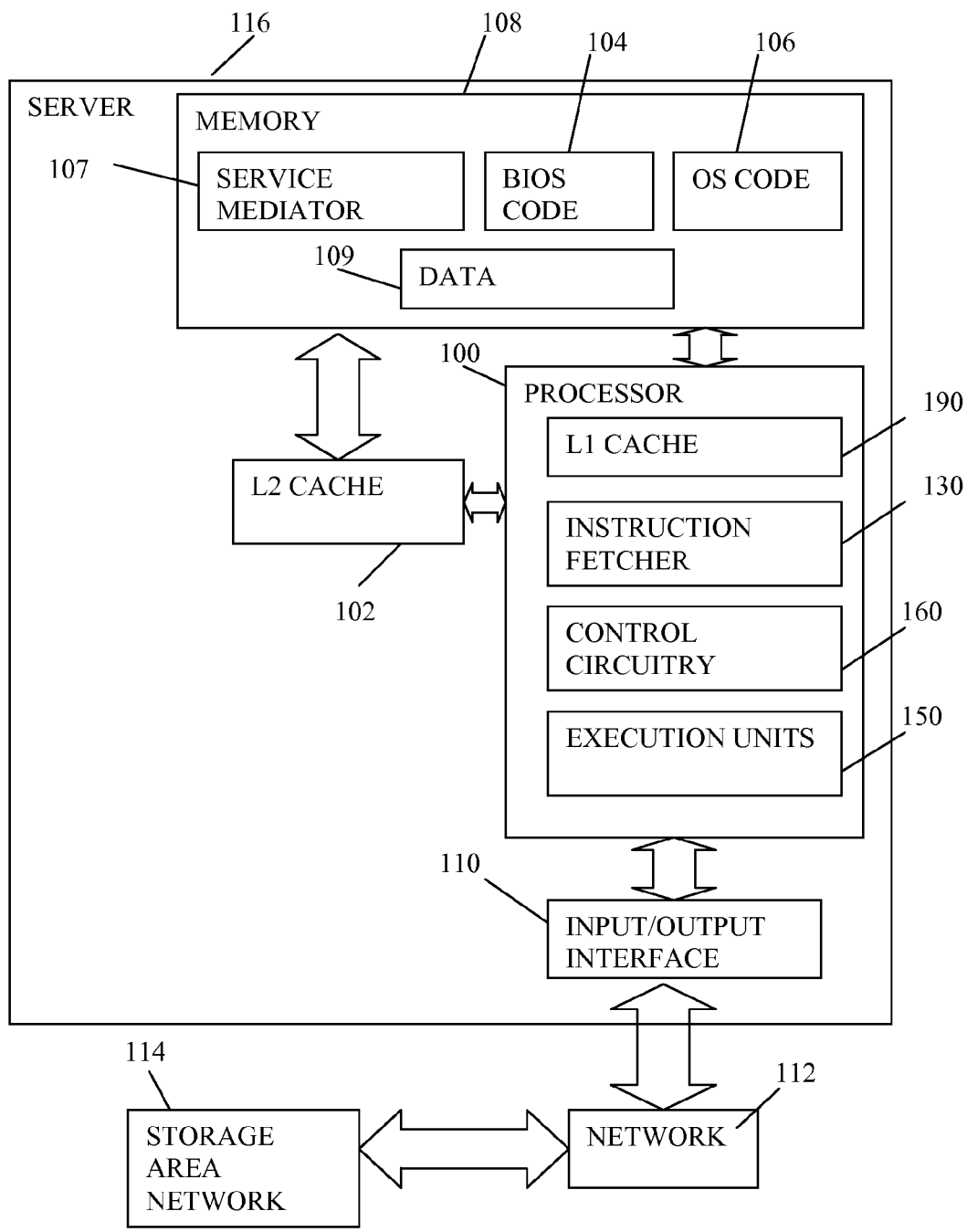
FIG. 1 depicts a server to execute service mediator software, according to an embodiment of the present invention.

The following is a detailed description of example embodiments depicted in the accompanying drawings. The example embodiments are described in detail. However, the amount of detail offered is not intended to limit the anticipated variations of embodiments; but, on the contrary, the intention is to cover all modifications, equivalents, and alternatives falling within the spirit and scope of the appended claims. The detailed description below is designed to render various embodiments obvious to a person of ordinary skill in the art.

In one embodiment, a service mediator at a server provides a service that is a composite of atomic services and executes a recovery pattern in the event that a service is not available. For example, a website hosted by a server may provide a composite of travel services, enabling a user to reserve a flight with any one of a plurality of airlines, to book a motel room, or reserve a rental car. A composite service is a service whose implementation calls other services. In contrast, an atomic service is one that is self-contained and does not invoke another service from a different source. In some embodiments, therefore, a composite service may call the services of atomic services and/or composite services from other sources. The travel company website may be a composite service that presents information and enables a user to schedule and purchase one some or all of the atomic services offered; namely, an airline flight, a hotel room, and a rental car.

From the perspective of a user of a computer linked to a server of the composite service, the composite service may appear homogenous. That is, in one embodiment, the composite service presented to the user does not appear to be services from several sources at different locations, but rather from a single source. But from the perspective of the composite service, each atomic service is seen as being provided at another source location. Thus, a composite service acts as both a service provider of the composite service and as a service consumer of its child services. A composite service acts as a child services coordinator.

In an initial phase of operation, the service mediator determines one or more recovery patterns for each atomic service offered in the composite service and stores in a database an identity of each such recovery pattern for each atomic service. In subsequent operation, the service mediator monitors the availability of each atomic service and stores the updated availability information in the database. When a user inquires of a composite service, the service mediator determines from the database if any of its atomic services is currently unavailable. If an atomic service is unavailable, the service mediator selects a recovery pattern and executes it. Or in an alternative embodiment, a user can select one of a plurality of recovery patterns.

A recovery pattern is a procedure to follow when a service is unavailable. A recovery pattern may be executed in the alternative to non-availability of the atomic services. For example, one recovery pattern is to find a redundant service endpoint to obtain the atomic service. An endpoint is a site from which the services and information about the service may be obtained. A provider of an atomic service may provide more than one endpoint, each of the plurality of endpoints giving access to a database of information associated with the service and enabling use of the service. Alternatively, a service may have only one endpoint. If there is no redundant service endpoint available, an alternative recovery pattern may be to take at least some data from the user presently, and process that data subsequently when the service becomes available. The recovery pattern may further include notifying the user of the results of the subsequent processing of the user-supplied data.

For example, the user may be informed of the unavailability of a car rental reservation service and may be invited to enter pertinent information about the user now. Then, when the car rental reservation service is once again available, the previously-entered data of the user is processed and a car rental reservation is made by the atomic service. The user is then notified by, for example, email that the reservation has been made. Yet another alternative recovery pattern is to notify the user that one of the atomic services is currently unavailable, but that the remaining atomic services are available, and to provide the services that are currently available, followed by notifying the user when the service that was unavailable becomes available. Although the example of a travel website for providing a composite of atomic travel services is described here in detail, embodiments may be for other composite services such as, for example, an investment website that aggregates buying and selling stocks, mutual funds investments, bonds, currency, etc., More than one recovery pattern may be associated with an atomic service. When an atomic service has a plurality of recovery patterns, they may be ranked in an order of preference. For example, finding a redundant endpoint for the unavailable service would be most preferred. If a redundant service endpoint is not available, a next highest preference might be to take data from the user now and process it later. If this is not feasible, one may simply notify the user that the service is currently unavailable and allow the user to obtain the remaining services now, notifying the user later when the service becomes available. Thus, some atomic services offer a plurality of recovery patterns that may be intelligently selected by the service mediator. Other recovery patterns known in the art or to be developed in the future may be implemented.

FIG. 1 shows a server 116 (herein sometimes referred to as a machine). Server 116 comprises at least one processor 100 that can operate according to BIOS (Basis Input/Output System) Code 104 and Operating System (OS) Code 106. The BIOS and OS code is stored in memory 108. The BIOS code is typically stored on Read-Only Memory (ROM) and the OS code is typically stored on the hard drive of server 116. Digital system 116 comprises a level 2 (L2) cache 102 located physically close to processor 100. Memory 108 also stores other programs for execution by processor 100 and stores data 109.

In an embodiment of server 116, memory 108 stores service mediation code 107 to mediate the different atomic services available from the same server or other servers. Memory 109 comprises a data structure or database comprising information about the recovery patterns available for each of a plurality of atomic services forming a composite service. Memory 109 also stores updated availability information for each of the atomic services. Service mediation code causes processor 100 to perform functions for determining and following recovery patterns when a service is unavailable. Thus, service mediator code will cause processor 100 to initially determine recovery patterns for each atomic service and store these into memory 109. Service mediation code 107 further causes processor 100 to monitor service availability and to select and execute a recovery pattern when a service becomes unavailable. Thus, some embodiments may be implemented by using service mediation computer code 107 stored in memory and executed by a processor.

Processor 100 comprises an on-chip level one (L1) cache 190, an instruction fetcher 130, control circuitry 160, and execution units 150. Level 1 cache 190 receives and stores instructions that are near to time of execution. Instruction fetcher 130 fetches instructions from memory. Execution units 150 perform the operations called for by the instructions. In one embodiment, these instructions include instructions to determine and store atomic service recovery pattern information, to monitor and store service availability information, and to execute a recovery pattern for a service that is unavailable. Execution units 150 may comprise load/store units, integer Arithmetic/Logic Units, floating point Arithmetic/Logic Units, and Graphical Logic Units. Each execution unit comprises stages to perform steps in the execution of the instructions fetched by instruction fetcher 130. In a superscalar architecture, different execution units operate in parallel. Thus, execution units 150 comprise a set of units of different types operating in parallel to execute instructions to recover from atomic service unavailability.

Control circuitry 160 controls instruction fetcher 130 and execution units 150. Control circuitry 160 also receives information relevant to control decisions from execution units 150. For example, control circuitry 160 is notified in the event of a data cache miss in the execution pipeline to process a stall.

Server 116 also typically includes other components and subsystems not shown, such as: a Trusted Platform Module, memory controllers, random access memory (RAM), peripheral drivers, a system monitor, a keyboard, a color video monitor, one or more flexible diskette drives, one or more removable non-volatile media drives such as a fixed disk hard drive, CD and DVD drives, a pointing device such as a mouse, and a network interface adapter, etc. Processor 100 may also communicate with a network 112 by way of Input/Output Device 110. The network connects server 116 with a storage area network of physical memory storage devices 114. These devices may include tape drive storage or hard disk arrays or other types of memory.

Thus, in one mode of operation of server 116, the L2 cache receives from the memory 108 data and instructions expected to be processed in the processor pipeline of processor 100. L2 cache 102 is fast memory located physically close to processor 100 to achieve greater speed. The L2 cache receives from memory 108 the instructions for a plurality of instruction threads. Such instructions may include load and store instructions, branch instructions, arithmetic logic instructions, floating point instructions, etc. The L1 cache 190 is located in the processor and contains data and instructions preferably received from L2 cache 102. Ideally, as the time approaches for a program instruction to be executed, the instruction is passed with its data, if any, first to the L2 cache, and then as execution time is near imminent, to the L1 cache.

Execution units 150 execute the instructions received from the L1 cache 190. Each of the units of execution units 150 may be adapted to execute a specific set of instructions. Instructions can be submitted to different execution units for execution in parallel. Data processed by execution units 150 are storable in and accessible from integer register files and floating point register files (not shown.) Data stored in these register files can also come from or be transferred to on-board L1 cache 190 or an external cache or memory. The processor can load data from memory, such as L1 cache, to a register of the processor by executing a load instruction. The processor can store data into memory from a register by executing a store instruction.

The memory of a server typically comprises Read-Only-Memory (ROM), cache memory implemented in DRAM and SRAM, a hard disk drive, CD drives and DVD drives. A server also may control access to other memory such as tape drives and hard disk arrays. Each server may store and execute its own application programs. Thus, some application programs, such as databases, may reside in the server and these programs may be available to computers in the network.

Thus, one embodiment is a system for providing a composite service that includes atomic services. The system comprises a memory to store a database of data identifying one or more recovery patterns associated with each one of the plurality of atomic services. The system monitors the availability of the atomic services and stores in the database an availability status of each of the plurality of atomic services. The system further comprises a processor to execute computer instructions to determine from the database if an atomic service is unavailable. If an atomic service is unavailable, the processor executes computer instructions to determine from the database one or more recovery patterns associated with the unavailable service. The processor further selects one of the one or more determined recovery patterns, and executes the selected recovery pattern.

Figure 2:
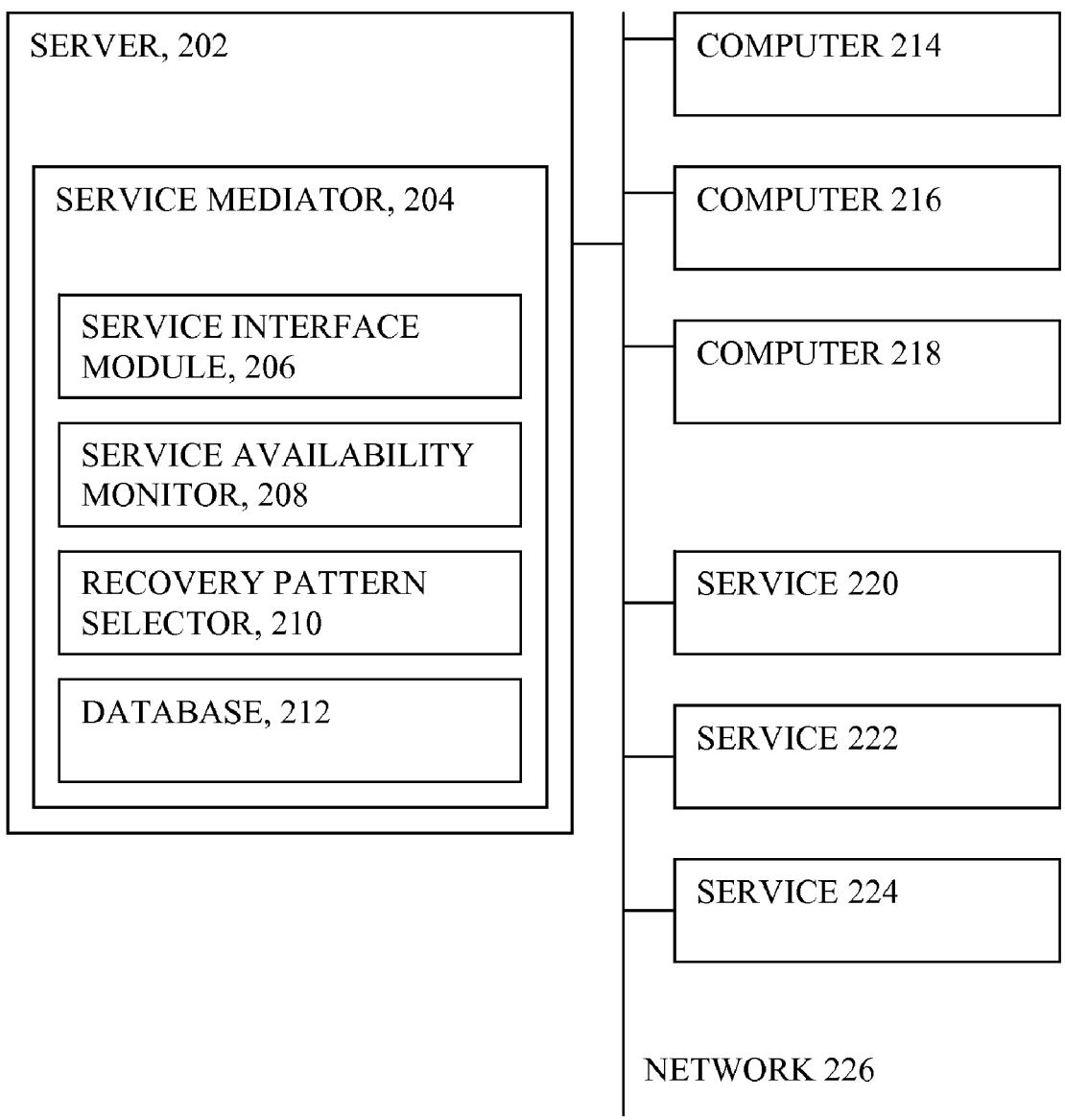
FIG. 2 depicts a network comprising a server with a service mediator, according to an embodiment of the present invention.

FIG. 2 shows a system 200 for providing services to a plurality of computers 214, 216, and 218 connected in a network 226. The network also connects a plurality of servers including server 202 and atomic services 220, 222, and 224. Services 220, 222, and 224 might be, for example, time of day services, airline flight data base, reservation and ticket purchasing, a data base of hotel rooms and rates by location, auto rental service, banking services, currency rates, etc. These services are provided over the network to server 202 and may also be provided directly to computers 214, 216, and 218.

Server 202 comprises a service mediator 204 to provide an interface for access to the individual atomic services or composite services, to monitor availability of the services, to implement a recovery procedure if a service fails, and to store a data base concerning service availability and recovery. More specifically, a service interface module 206 of service mediator 204 receives data from one or more services 220, 222, and 224, and stores this data in a logical orderly format. The data can be sent by service interface module 206 to computer 214 where it can be displayed on a screen of user computer 214. For example, the airline data from different airline services may be gathered by the service mediator, enabling the user of computer 214 to select a flight by merely clicking in a box in a row for a desired flight. Thus, service interface module 206 presents to a user computer the data it receives from one or more services and receives responses and selections of the user by keyboard and/or a mouse.

Server mediator 204 comprises a service availability monitor 208 to monitor availability of atomic services and to periodically update the database with the latest availability information. In one embodiment, service availability monitor 208 may periodically poll a service to determine if it is available. Or in another embodiment polling begins only after a failure. Or in another embodiment, each service notifies service availability monitor 208 of a change of service availability.

Service mediator 204 comprises a recovery pattern selector 210. Recovery pattern selector 210 receives information from an atomic service described herein concerning a recovery pattern associated with a service so that selector 210 can intelligently choose a recovery pattern if the service fails. For example, one recovery pattern may involve selecting a redundant service endpoint. If a working redundant service endpoint is not available, selector 210 can choose to provide the service asynchronously. Thus, the pattern selected may invite the user to enter data to be processed later, later notifying the user of the results of the processing, (e.g., whether reservation was made.) Or, for example, the service mediator 204 can notify the user by email when the service once again becomes available.

Service mediator 204 comprises a database 212. Database 212 comprises information about the availability of the various atomic services and information about the recovery patterns available for each atomic service. Thus, when a user logs in to a service provider's website and tries to use a composite service or an atomic service, service interface module 206 examines database 212 to determine if all of the atomic services required to perform the functionality of the composite service (or just the atomic service in case the user requested just that particular service) at the website are available. If so, the user may continue browsing the site and entering selections and data. If a service is not available, service interface module 206 may examine database 212 to determine what recovery pattern is available. An atomic service may provide one or more recovery patterns. These recovery patterns include recovery patterns now known and those to be developed in the future. Service interface module 206 of service mediator 204 may select from a ranking of recovery patterns. For example, a first choice of recovery pattern may be to use a redundant service endpoint that is available. A service endpoint is a location providing the services of the atomic service. One website may have links to a plurality of endpoints. A second choice of recovery pattern may be an asynchronous response, wherein data needed by the service, such as a user selection of an item, may be gathered now, with a response to be delivered later.

In some cases, for example, a service may not be available to accept reservation of a hotel room but may still provide data about the availability of rooms. In such cases, service interface module 206 may collect data from the user such as a hotel selected from a list and one of a class of suites preferred by the user, wherein a class may be smoking or non-smoking, or refer to a room of a specific size or with specific amenities. Service interface module 206 accepts the data from the user and stores it until a service 222 for actually making the reservation is available. At that time, or at a subsequent time, the service 222 receives the user-supplied data from service interface module 206 and processes the reservation. Processing the reservation could include determining if a desired room will be available on the requested dates, and actually assigning a room to the user and reserving the requested dates. Thus, in some cases, data for a process can be gathered now, with subsequent processing and confirmation to be performed later when the service becomes available. In such cases, a recovery pattern that may be selected by recovery pattern selector 210 is to collect certain information now, process the information later when the service is once again available, and then send the user information about the results of the process at the later time.

Thus, some embodiments include a service mediator for selecting and executing a recovery pattern when an atomic service is unavailable. The service mediator comprises a service interface module which determines for each of a plurality of atomic services at least one recovery pattern. A service availability monitor monitors the availability of each of a plurality of atomic services. This may be done periodically. A database stores information about recovery patterns available for each atomic service and stores updated availability information of each atomic service. A recovery plan selector selects and executes a recovery pattern for an unavailable service. In some embodiments, the service interface module displays availability information for each of a plurality of atomic services. In some embodiments, the service interface module enables a user to select one of a plurality of recovery patterns associated with an atomic service. Also in some embodiments, the recovery pattern selector prioritizes recovery patterns for an atomic service.

Figure 3:
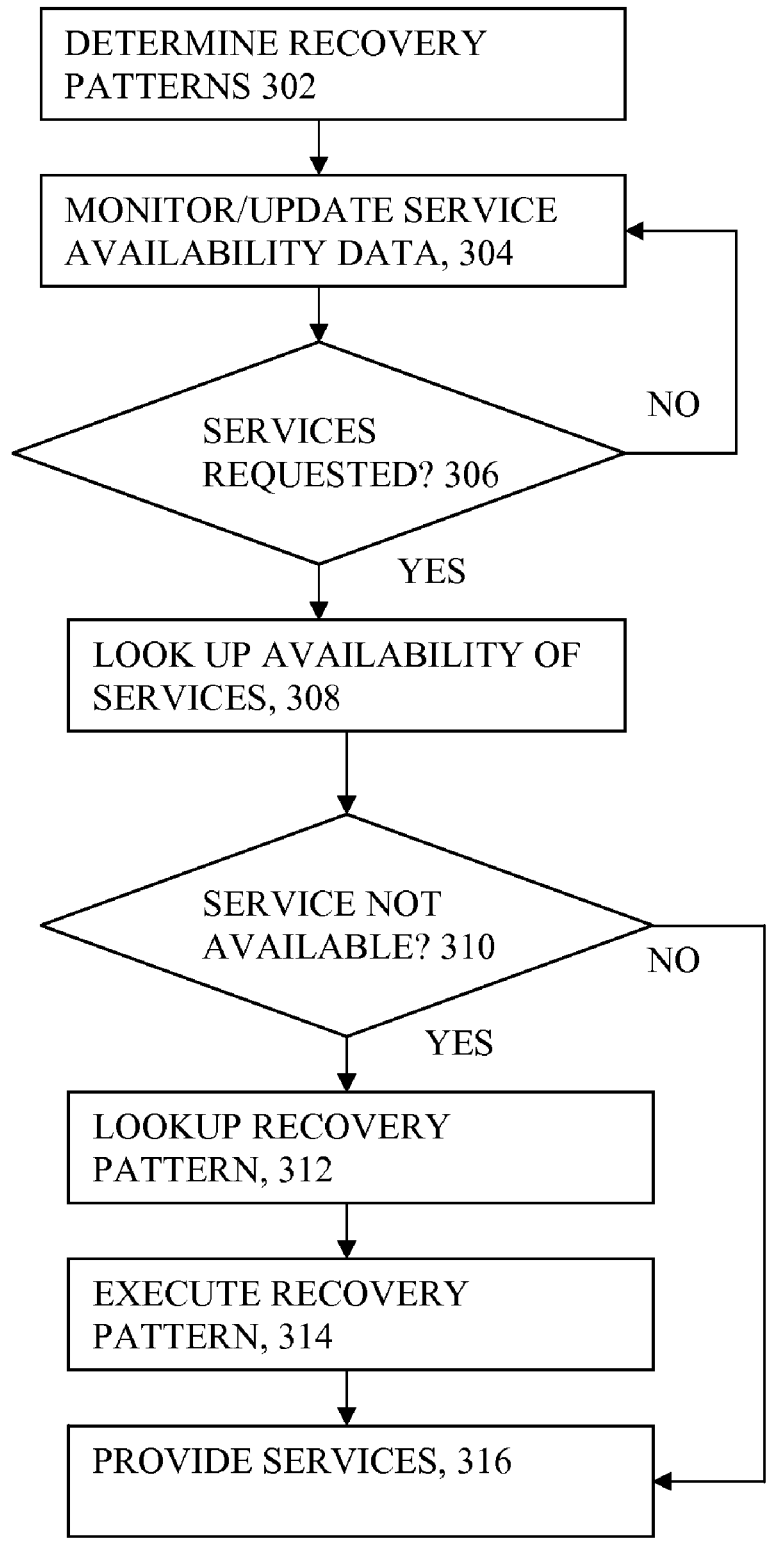
FIG. 3 depicts a flow chart for determining when a service is not available and for determining and executing a recovery pattern, according to an embodiment of the present invention.

FIG. 3 shows a flow chart 300 for providing services to a user and executing a recovery pattern when a service fails. In an initial phase of operation, a service mediator determines the available recovery patterns for each service in a composite of services provided at a website (element 302). As operation continues, a service availability monitor monitors service availability and periodically updates the database concerning service availability (element 304). When services are requested by a user (element 306), the service mediator looks in the database to determine the availability of each individual service that makes up the composite of services (element 308). If all services are currently available (element 310), then the service mediator provides the services (element 316).

If a service is not available (element 310), the recovery pattern selector will look in the database to determine what recovery patterns are available (element 312). With each recovery pattern there may be associated a ranking to determine its priority, if any. When the recovery pattern with the highest priority is not available, such as when a redundant service endpoint is not available, the recovery pattern chosen will be the one with the next highest priority. This recovery pattern may be, for example, taking data from the user and processing it later. Once the recovery pattern is identified, the service mediator executes it (element 314) and the services that can be provided are provided (element 316).

For example, consider a travel agency website that enables a user to schedule flights, book hotel rooms, and reserve rental cars. In an initial phase of operation, a service mediator of the website determines recovery patterns for each atomic service needed to present the composite of those services to the user. For example, one or more airline services may have redundant service endpoints. Also, for example, if one airline service fails, the service mediator may decide to provide the service for less than all of the airline services, excluding information about the airline service that failed. Thus, one recovery pattern for a failed one of the atomic services is to provide all the services but the failed service. The user may be given notice of the failed service. A user may be emailed later when the service becomes available. Another recovery pattern to recover when there is an unavailable service is to make a connection to a redundant service endpoint, if one is available. Another recovery pattern to recover when there is an unavailable service is to collect such information from the user as needed to at least partially complete a process of providing the service, to complete the process when the service next becomes available, and to inform the user of results of the completed process.

Thus, one embodiment is a computer-implemented method for providing atomic services through a composite service offering each atomic service. The method, provided at a server hosting the composite service, determines a recovery pattern for each atomic service and stores data identifying the recovery pattern in a database. The method further comprises periodically determining the availability of each atomic service comprising the composite service and storing in the database the updated availability information for each atomic service. The method comprises receiving from a user computer connected to the network that the server is in, a request to use the composite service. When a request is received, the method comprises determining from the database if an atomic service is currently unavailable. If so, the method comprises selecting a recovery pattern from among one or more recovery patterns stored in the database for the unavailable atomic service. The method then executes the identified recovery pattern for the unavailable service.

A recovery pattern selected in the method may comprise finding a redundant service endpoint. Another recovery pattern may comprise taking data from a user and processing the data at a subsequent time when the service becomes available. Another recovery pattern may comprise notifying a user of results of the processing of the data. Another recovery pattern may comprise notifying a user by email when a service that was unavailable has now become available. In some embodiments, the method involves ranking a plurality of recovery patterns for an atomic service. Some embodiments comprise enabling a user to select one of a plurality of recovery patterns for an atomic service. Thus, some embodiments notify the user of the unavailability of an atomic service, allowing the user to decide whether to submit data required by the service now or later.

Some embodiments can take the form of an entirely hardware embodiment, an entirely software embodiment or an embodiment containing both hardware and software elements. Some embodiments are thus implemented in software, which includes but is not limited to firmware, resident software, microcode, etc. Furthermore, embodiments can take the form of a computer program product accessible from a machine accessible readable medium providing program code for use by or in connection with a server such as shown in FIG. 1, or any instruction execution system. For the purposes of this description, a machine accessible or computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a machine accessible medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory 108 employed during actual execution of the program code, bulk storage, and cache memories 102, 190, which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Thus, another embodiment provides a computer program product containing instructions effective, when executing in a data processing system, to cause the system to perform a series of operations for recovering when a service is unavailable. The operations comprise storing a database of data that identifies the recovery patterns associated with each one of the plurality of atomic services provided by a composite service. A recovery pattern is a procedure to follow when a service is unavailable. The operations comprise storing in the database the availability of each of the plurality of atomic services. The operations also comprise determining from the database if an atomic service is unavailable when a user seeks to use the composite service. The operations further comprise determining from the database one or more recovery patterns associated with an unavailable service. The operations also comprise selecting one of the one or more determined recovery patterns, and executing the selected recovery pattern.

Although some embodiments have been described in detail, it should be understood that various changes, substitutions and alterations can be made herein without departing from the spirit and scope of the appended claims. Although an embodiment may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:

1. A computer-implemented method for providing atomic services through a composite service offering each atomic service, comprising:

determining by a server connected to a network, at least one recovery pattern for each atomic service, including a plurality of recovery patterns for at least one of the atomic services, the plurality of recovery patterns including a first recovery pattern comprising finding a redundant service endpoint for an unavailable service and at least a second recovery pattern in addition to finding a redundant service endpoint, wherein the second recovery pattern, executed responsive to determining there is no redundant service endpoint, comprises taking data from a user and processing the data at a subsequent time when the service becomes available;

storing data identifying the at least one recovery pattern for each atomic service in a database, and associating the identifying data with respective atomic services;

periodically determining by the server, an availability of each atomic service and storing updated availability information for each atomic service in the database;

receiving by the server from a user computer connected to the network, a request to use the composite service;

determining from the database that an atomic service is currently unavailable;

selecting a recovery pattern from among one or more recovery patterns stored in the database for the unavailable atomic service; and executing the identified recovery pattern for the unavailable service.

2. The method of claim 1, wherein the recovery pattern further comprises notifying a user of results of the processing of the data.

3. The method of claim 1, wherein a recovery pattern comprises notifying a user by email when a service that was unavailable has now become available.

4. The method of claim 1, further comprising ranking a plurality of recovery patterns for an atomic service.

5. The method of claim 1, further comprising enabling a user to select one of a plurality of recovery patterns for an atomic service.

6. A computer system for providing a composite service comprising a plurality of atomic services, the system comprising:
- a memory to store a database of data identifying at least one recovery pattern associated with each one of the plurality of atomic services, including a plurality of recovery patterns for at least one of the atomic services, the plurality of recovery patterns including a first recovery pattern comprising finding a redundant service endpoint for an unavailable service and at least a second recovery pattern in addition to finding a redundant service endpoint, and to store in the database an availability status of each of the plurality of atomic services, wherein the second recovery pattern, executed responsive to determining there is no redundant service endpoint, comprises taking data from a user and processing the data at a subsequent time when the service becomes available; and
- a processor to:
- determine from the database that an atomic service is unavailable;
- determine from the database one or more recovery patterns associated with an unavailable service;
- select one of the one or more determined recovery patterns; and
- execute the selected recovery pattern.

7. The system of claim 6, wherein the recovery pattern further comprises notifying a user of results of the processing of the data.

8. The system of claim 6, wherein a recovery pattern comprises notifying a user by email when a service that was unavailable has now become available.

9. The system of claim 6, further comprising ranking a plurality of recovery patterns for an atomic service.

10. A computer program product comprising:
- a computer useable storage medium having a computer readable program, wherein the computer readable program when executed on a computer causes the computer to:
- store a database of data identifying at least one recovery pattern associated with each one of a plurality of atomic services, including a plurality of recovery patterns for at least one of the atomic services, the plurality of recovery patterns including a first recovery pattern comprising finding a redundant service endpoint for an unavailable service and at least a second recovery pattern in addition to finding a redundant service, wherein the second recovery pattern comprises taking data from a user and processing the data at a subsequent time when the service becomes available and the second recovery pattern is for execution responsive to determining there is no redundant service endpoint;
- store in the database an availability status of each of the plurality of atomic services;
- determine from the database that an atomic service is unavailable;
- determine from the database one or more recovery patterns associated with an unavailable service;
- select one of the one or more determined recovery patterns; and
- execute the selected recovery pattern.

11. The computer product of claim 10, wherein the recovery pattern further comprises notifying a user of results of the processing of the data.

12. The computer program product of claim 10, further comprising ranking a plurality of recovery patterns for an atomic service.

13. A service mediator apparatus for selecting and executing a recovery pattern when an atomic service is unavailable, comprising:
- at least one processor;
- a computer readable storage media including instructions configured for causing the processor to perform functions, wherein the instructions comprise:
- a service interface module for causing the processor to determine for each of a plurality of atomic services at least one recovery pattern, including a plurality of recovery patterns for at least one of the atomic services, the plurality of recovery patterns including a first recovery pattern comprising finding a redundant service endpoint for an unavailable service and at least a second recovery pattern in addition to finding a redundant service endpoint and including a second recovery pattern, wherein the second recovery pattern comprises taking data from a user and processing the data at a subsequent time when the service becomes available and the second recovery pattern is for execution responsive to determining there is no redundant service endpoint;
- a service availability monitor for causing the processor to monitor the availability of each of the plurality of atomic services;
- wherein the apparatus further includes a database in which the processor stores information about at least one recovery pattern for each atomic service and about availability of each atomic service; and
- a recovery plan selector for causing the processor to select and execute a recovery pattern for an unavailable service.

14. The service mediator of claim 13, wherein the service interface module displays availability information for each of a plurality of atomic services.

15. The service mediator of claim 13, wherein the service interface module enables a user to select one of a plurality of recovery patterns associated with an atomic service.

16. The service mediator of claim 13, wherein the recovery pattern selector prioritizes recovery patterns for an atomic service.

* * * * *